(12) United States Patent
Park et al.

(10) Patent No.: US 11,575,268 B2
(45) Date of Patent: Feb. 7, 2023

(54) ROBOT, CHARGING PAD, AND ROBOT CHARGING SYSTEM INCLUDING SAME

(71) Applicant: NAVER LABS CORPORATION, Seongnam-si (KR)

(72) Inventors: Kay Park, Seongnam-si (KR); Minsu Kim, Seongnam-si (KR); Jaehun Han, Seongnam-si (KR); Joonho Seo, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 70 days.

(21) Appl. No.: 17/090,245

(22) Filed: Nov. 5, 2020

(65) Prior Publication Data

US 2021/0135468 A1 May 6, 2021

(30) Foreign Application Priority Data

Nov. 6, 2019 (KR) .......................... 10-2019-0141157

(51) Int. Cl.
*H02J 50/90* (2016.01)
*H02J 7/00* (2006.01)
(Continued)

(52) U.S. Cl.
CPC .......... *H02J 7/0042* (2013.01); *G05D 1/0225* (2013.01); *H02J 7/0013* (2013.01);
(Continued)

(58) Field of Classification Search
CPC ..................................................... H02J 50/90
(Continued)

(56) References Cited

U.S. PATENT DOCUMENTS

| 9,923,389 B2 * | 3/2018 | Kwon | H02J 50/12 |
| 2008/0174268 A1 * | 7/2008 | Koo | H02J 7/0045 |
| | | | 320/109 |

(Continued)

FOREIGN PATENT DOCUMENTS

| EP | 3431328 A1 * | 1/2019 | B60L 53/14 |
| JP | 2002142376 A | 5/2002 | |

(Continued)

OTHER PUBLICATIONS

Office action issued in corresponding Korean patent application No. 10-2019-0141157, dated Jan. 13, 2020.

*Primary Examiner* — Edward Tso
*Assistant Examiner* — Ahmed H Omar
(74) *Attorney, Agent, or Firm* — Greer Burns & Crain Ltd.

(57) ABSTRACT

A charging pad according to the exemplary embodiment of the present invention may include an input terminal connected to a high-priority charging pad; an output terminal connected to a low-priority charging pad; a charging unit configured to charge a robot positioned on the charging pad in accordance with a preset operating state; and a control unit configured to switch an operating state of the charging unit from an operation stop state to an operation standby state when a status signal for the high-priority charging pad is received from the input terminal. The control unit is configured to output the status signal for the charging pad through the output terminal when occupation of the charging unit by the robot is detected in the operation standby state.

12 Claims, 12 Drawing Sheets

(51) Int. Cl.
*H02J 50/10* (2016.01)
*H02J 50/40* (2016.01)
*G05D 1/02* (2020.01)

(52) U.S. Cl.
CPC .............. *H02J 50/10* (2016.02); *H02J 50/40* (2016.02); *H02J 50/90* (2016.02)

(58) Field of Classification Search
USPC .......................................................... 320/108
See application file for complete search history.

(56) References Cited

U.S. PATENT DOCUMENTS

| | | | |
|---|---|---|---|
| 2016/0023557 A1* | 1/2016 | Dimke ................... | H02J 7/007 320/108 |
| 2020/0212721 A1* | 7/2020 | Narayana Bhat ..... | B60L 53/122 |
| 2021/0046831 A1* | 2/2021 | Kim ...................... | H02J 7/0013 |

FOREIGN PATENT DOCUMENTS

| KR | 1020080060535 A | 7/2008 |
|---|---|---|
| KR | 100940189 B1 | 2/2010 |
| KR | 1020100066134 A | 6/2010 |
| KR | 1020150109977 A | 10/2015 |
| KR | 1020160133585 A | 11/2016 |
| KR | 102014333 B1 | 8/2019 |

\* cited by examiner

ROBOT, CHARGING PAD, AND ROBOT CHARGING SYSTEM INCLUDING SAME

CROSS-REFERENCE TO RELATED APPLICATIONS

This application claims priority to and the benefit of Korean Patent Application No. 10-2019-0141157 filed in the Korean Intellectual Property Office on Nov. 6, 2019, the entire contents of which are incorporated herein by reference.

BACKGROUND OF THE INVENTION

Field of Invention

The present application relates to a robot, a charging pad, and a robot charging system including the same, and more particularly, to a robot charging system capable of efficiently charging a plurality of autonomous mobile robots.

Description of Related Art

A robot, such as a cleaning robot, is supplied with necessary power from a built-in battery because of characteristics of a workspace. In the case of the robot using a battery, it is necessary to recharge the battery after a certain period of time.

In order to charge the robot so that the robot is able to continuously operate, the robot needs to be precisely moved to a place where a charging device is located, and then necessary power needs to be supplied from a charger to the robot through an electrical contact such as an electrically connectable plug. Therefore, in the related art, in order to bring the robot into contact with an electrical contact of a power supply module, there is a need for a technology for detecting a position of the robot and moving the robot with high precision.

BRIEF SUMMARY OF THE INVENTION

The present application has been made in an effort to provide a robot, a charging pad, and a robot charging system including the same, which are capable of efficiently charging a plurality of robots without having to establish a central management system.

The present application has also been made in an effort to provide a robot, a charging pad, and a robot charging system including the same, which are capable of easily charging the robot without a technology for detecting the position of the robot or moving the robot with high precision in order to bring the robot into contact with an electrical contact to charge the robot.

The present application has also been made in an effort to provide a robot, a charging pad, and a robot charging system including the same, in which a charging station may be easily expanded using the charging pad having a simple structure.

An exemplary embodiment of the present invention provides a charging pad configured to charge a robot, the charging pad including: an input terminal connected to a high-priority charging pad; an output terminal connected to a low-priority charging pad; a charging unit configured to charge a robot positioned on the charging pad in accordance with a preset operating state; and a control unit configured to switch an operating state of the charging unit from an operation stop state to an operation standby state when a status signal for the high-priority charging pad is received from the input terminal, the control unit being configured to output the status signal for the charging pad through the output terminal when occupation of the charging unit by the robot is detected in the operation standby state.

Another exemplary embodiment of the present invention provides a robot configured to autonomously travel and including: a sensor unit configured to generate sensing data in accordance with a movement by using a plurality of sensors; a driving unit connected to a motor driven by a battery and configured to move the robot; and a control unit configured to generate position information by using the sensing data, control an operation of the driving unit by setting a traveling route based on the position information, and set a preferential stopping area in the traveling route so that the robot passes through a charging station when a state of charge (SOC) of the battery is equal to or lower than a reference value.

Still another exemplary embodiment of the present invention provides a robot charging system including: a robot configured to autonomously travel and set a traveling route so that the robot passes through a charging station when a state of charge (SOC) of a battery is equal to or lower than a reference value; and a charging station made by coupling a plurality of charging pads, configured to switch a low-priority charging pad to an operation standby state when a high-priority charging pad in an operation standby state is occupied by the robot and the robot is charged, and configured to switch the low-priority charging pad to an operation stop state when the occupation of the high-priority charging pad is stopped.

The solutions for achieving the objects of the present invention do not enumerate all features of the present invention. Various features of the present invention and advantages and effects thereof may be understood in more detail with reference to the following specific exemplary embodiments.

According to an exemplary embodiment of the present invention, the traveling route along which the robot passes through the charging station is set so that the robot is charged when the robot needs to be charged, such that the plurality of robots may be efficiently charged without a separate central management system.

According to an exemplary embodiment of the present invention, the robot automatically stops moving and is charged when the charging operation of the charging pad is detected, such that the robot may be easily charged without a technology for detecting a position of the robot or moving the robot with high precision in order to bring the robot into contact with an electrical contact to charge the robot.

According to an exemplary embodiment of the present invention, the charging station may be configured by arranging the charging pads having the simple structures, such that the charging station may be easily expanded as necessary.

However, the effects obtained by the robot, the charging pad, and the robot charging system including the same according to the exemplary embodiments of the present invention are not limited to the aforementioned effects, and other effects, which are not mentioned above, will be clearly understood by those skilled in the art from the following description.

DETAILED DESCRIPTION OF THE INVENTION

Figure 1A:
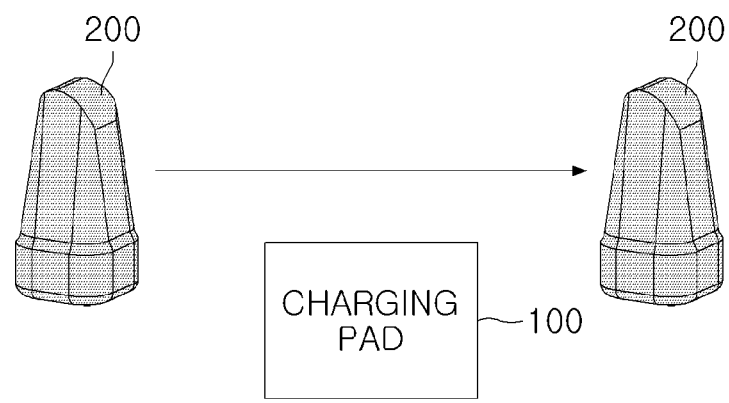
FIGS. 1A and 1B are schematic views illustrating an operation of charging a robot by using a charging pad according to an exemplary embodiment of the present invention.

Hereinafter, exemplary embodiments disclosed in the present specification will be described in detail with reference to the accompanying drawings. The same or similar constituent elements are assigned with the same reference numerals regardless of the view of the drawings, and the repetitive description thereof will be omitted. The suffixes 'module', 'unit', 'part', and 'portion' used to describe constituent elements in the following description are used together or interchangeably in order to facilitate the description, but the suffixes themselves do not have distinguishable meanings or functions. That is, the term 'unit', 'part', or 'portion' used in the present invention may mean a software or a hardware component such as FPGA, or ASIC, and the 'unit', 'part', or 'portion' performs certain functions. However, the term 'unit', 'part', or 'portion' is not limited to software or hardware. The term 'unit', 'part', or 'portion' may be configured to be in an addressable storage medium or configured to reproduce one or more processors. Thus, as an example, the term 'unit', 'part', or 'portion' includes components such as software components, object-oriented software components, class components, and task components, processes, functions, properties, procedures, subroutines, segments of program codes, drivers, firmware, microcode, circuitry, data, database, data structures, tables, arrays, and variables. The functions provided in the components, 'units', 'parts', and 'portions' may be combined into a smaller number of components, 'units', 'parts', and 'portions' and/or divided into additional components, 'units', 'parts', and 'portions'.

In the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

Exemplary embodiments of the present invention will be described with reference to FIGS. 1 to 13. A charging pad 100 illustrated in the drawings is illustrated as a blank in an operation stop state and illustrated as being shaded in an operation standby state.

Figure 1B:
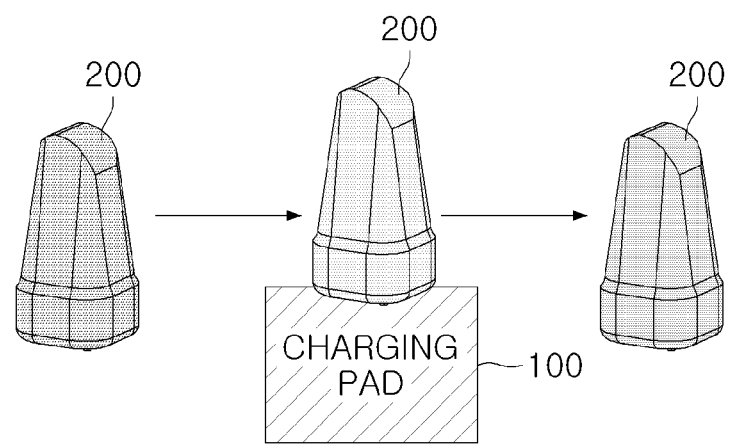

FIGS. 1A and 1B are schematic views illustrating an operation of charging a robot by using a charging pad according to an exemplary embodiment of the present invention.

The charging pad 100 may charge a robot 200 positioned on the charging pad 100. The charging pad 100 may support a wired or wireless charging operation. In the case of supporting the wired charging operation, a configuration for providing electrical contacts may be additionally provided between the charging pad 100 and the robot 200.

The robot 200 may move in an autonomous manner, and a traveling route along which the robot 200 passes through the charging pad 100 when the robot 200 needs to be charged may be set. In this case, whether to allow the robot 200 to stay on the charging pad 100 to charge the robot 200 may vary depending on operating states of the charging pad 100, and the operating states of the charging pad 100 may include the operation stop state and the operation standby state.

The operation standby state refers to a state in which the robot 200 may be charged by the charging pad 100. That is, when the robot 200 is positioned on the charging pad 100 in the operation standby state, the charging pad may charge the robot 200. In contrast, the operation stop state refers to a state in which the charging pad 100 does not perform the charging operation and the robot 200 cannot be charged by the charging pad 100. Therefore, in the operation stop state, the robot 200 may not be charged even though the robot 200 is positioned on the charging pad 100.

According to the exemplary embodiment, the charging pad 100 may perform a wireless charging operation by using an electromagnetic induction method. In this case, the charging pad 100 in the operation standby state may generate an electromagnetic field on the charging pad 100. Therefore, when the robot 200 is positioned on the charging pad 100 in the state in which the charging pad 100 is in the operation standby state, induced current generated by the electromagnetic field on the charging pad 100 may be transmitted to a wireless charging receiver in the robot 200, and a battery in the robot connected to the wireless charging receiver may be charged. In contrast, in the operation stop state, because the charging pad 100 does not generate the electromagnetic field, the robot 200 is not charged even though the robot 200 is positioned on the charging pad 100.

However, the above-mentioned electromagnetic induction method is an example of a wireless charging method, and other wireless charging methods may be used, or a contact type wired charging method may be used.

When the operating state of the charging pad 100 is in the operation stop state as illustrated in FIG. 1A, the charging operation is not initiated even though the robot 200 passes over the charging pad 100 while traveling along the set route, and the robot 200 may pass the charging pad 100 without being charged and travel along the predetermined traveling route.

In contrast, when the operating state of the charging pad 100 is in the operation standby state as illustrated in FIG. 1B, the operation of charging the robot 200 may be initiated when the robot 200 is positioned on the charging pad 100 while traveling. In this case, when the charging operation is detected, the robot 200 may stop moving and be seated on the charging pad 100, such that the robot 200 may be consistently charged by the charging pad 100. Thereafter, when the charging operation is completed, the robot 200 may move away from the charging pad 100. That is, the robot 200 may be charged by stopping on the charging pad 100 in the operation standby state and may move away from the charging pad 100 when the charging operation is completed.

Figure 2:
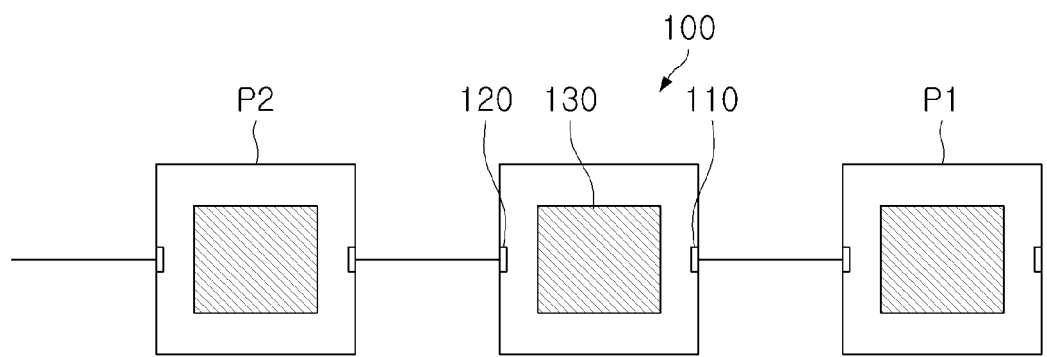
FIG. 2 is a schematic view illustrating a charging array made by connecting the charging pads according to an exemplary embodiment of the present invention.

However, in the case of a plurality of robots 200, because only one charging pad 100 is insufficient, a plurality of charging pads 100 needs to be efficiently connected and used. That is, as illustrated in FIG. 2, a charging array may be configured by connecting the plurality of charging pads 100 in series.

In this case, priorities of the charging pads 100 in the charging array may be set in the order from a rightmost charging pad P1, and the robots 200 may be sequentially charged in accordance with the priorities of the respective charging pads 100. That is, the robot 200 is guided first to occupy the charging pads having high priorities, such that the charging array may efficiently perform the charging operation.

Hereinafter, the charging pad 100 according to the exemplary embodiment of the present invention will be described with reference to FIGS. 2 and 3.

Figure 3:
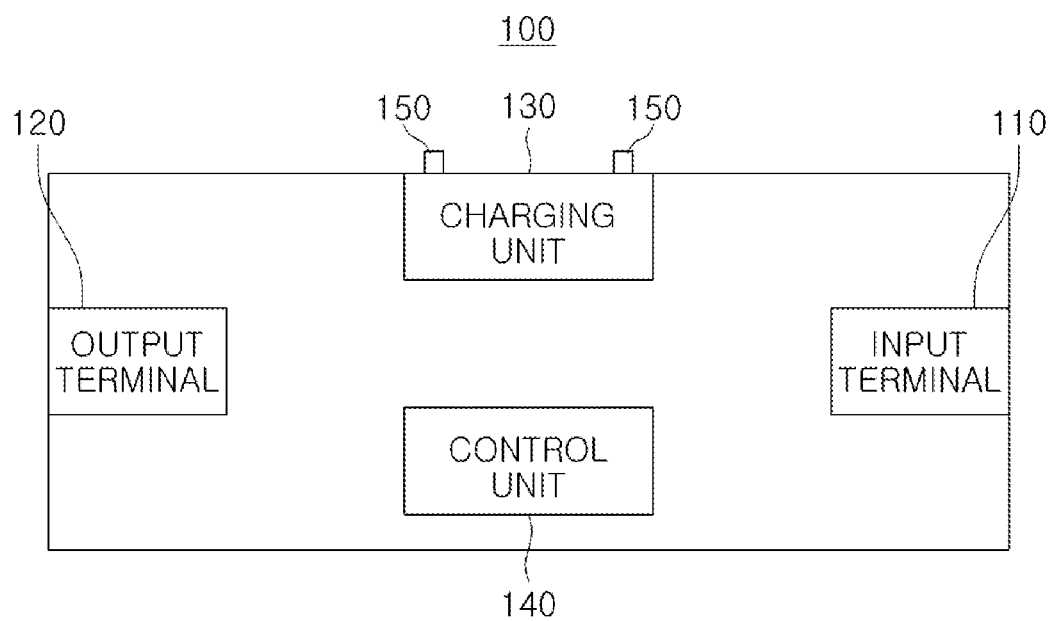
FIG. 3 is a block diagram of the charging pad according to an exemplary embodiment of the present invention.

FIG. 3 is a block diagram of the charging pad according to an exemplary embodiment of the present invention.

Referring to FIG. 3, the charging pad 100 may include an input terminal 110, an output terminal 120, a charging unit 130, and a control unit 140. The control unit 140 may include any type of device capable of processing data, such as a processor. Here, the processor may refer to a hardware built-in data processing device having a circuit physically structured to perform a function expressed in a code or instructions included in a program. Examples of the hardware built-in data processing device may include processing devices such as a microprocessor, a central processing unit (CPU), a processor core, a multiprocessor, an application-specific integrated circuit (ASIC), a field programmable gate array (FPGA), etc.

The input terminal 110 may be connected to the high-priority charging pad P1, and the output terminal 120 may be connected to a low-priority charging pad P2. In this case, the priorities of the respective charging pads may be determined in the order in which the charging pads are connected in series from the highest-priority charging pad positioned at the outermost periphery.

For example, as illustrated in FIG. 2, the charging pad P1 positioned at the rightmost side may be set as the highest-priority charging pad, and the priorities may be determined such that that the charging pad 100 connected to the left side of the highest-priority charging pad P1 is set as the second-priority charging pad and the low-priority charging pad P2 connected to the left side of the second-priority charging pad 100 may be set as the third-priority charging pad.

In this case, the highest-priority charging pad may be set by a user's selection. According to the exemplary embodiment, the charging pad 100, which is not connected to the input terminal 110, may be automatically set as the highest-priority charging pad.

The charging pad 100 may receive a status signal outputted from the high-priority charging pad P1 through the input terminal 110, and the status signal of the charging pad 100 may be outputted to the low-priority charging pad P2 through the output terminal 120. In this case, the status signal may be a signal indicating that the corresponding charging pad is charging the robot 200.

The charging unit 130 may charge the robot 200 positioned on the charging pad 100 in accordance with the operating state of the charging pad 100. That is, the charging pad 100 in the operation standby state may charge the robot 200 positioned on the charging pad 100, and the charging pad 100 in the operation stop state may not charge the robot 200. The charging unit 130 may support the operations of charging the robot 200 in wired and wireless manners, and the charging unit 130 may notify the control unit 140 that the operation of charging the robot 200 is in progress while the robot 200 occupies the charging pad 100 and is charged. According to the exemplary embodiment, the charging unit 130 may notify the control unit 140 that the robot is being charged by a method of transmitting charging current, which is generated during the charging operation, to the control unit 140.

When the control unit 140 receives the status signal for the high-priority charging pad P1 from the input terminal 110, the control unit 140 may switch the operating state of the charging pad 100 downstream of the charging pad P1 from the operation stop state to the operation standby state. That is, because the case in which the status signal is received means that the robot 200 is positioned and being charged on the high-priority charging pad P1, the charging unit 130 may be switched to the operation standby state so that another robot 200 may be charged on the charging pad 100.

Thereafter, when it is detected that the robot 200 occupies the charging unit 130 and is charged in the operation standby state, the control unit 140 may output the status signal through the output terminal 120. That is, since the current charging pad 100 is also occupied and performs the charging operation, the status signal for the current charging pad 100 may be transmitted so that the next low-priority charging pad P2 may perform the charging operation.

Meanwhile, the control unit 140 may periodically or continuously check whether the status signal is received from the input terminal 110. The control unit 140 may check the current operating state of the charging unit 130 when the status signal is not received from the input terminal 110. In this case, when the operating state of the charging unit 130 is in the operation stop state, the operation stop state may be maintained. That is, since the high-priority charging pad P1 does not perform the charging operation, the operating state of the current charging pad 100 may be maintained as the operation stop state.

In contrast, when the status signal is not received from the input terminal 110 and the operating state of the charging unit 130 is in the operation standby state, the operating state may be switched from the operation standby state to the operation stop state. That is, when the status signal is not inputted in the state in which the current charging pad 100 is in the operation standby state, this means that the occupation of the high-priority charging pad P1 by the robot 200 has ended as the charging operation is completed by the high-priority charging pad P1. In this case, since the high-priority charging pad P1 is vacant, the control unit 140 may stop the charging operation of the current charging pad 100 by switching the operating state of the charging pad 100 to the operation stop state in order to fill the high-priority charging pad P1 first.

Therefore, when the robot 200 is being charged on the current charging pad 100, the charging operation of the current charging pad 100 is stopped, such that the robot 200 travels along the predetermined route to the high-priority charging pad P1, and may be charged by the high-priority charging pad P1. In addition, even in a case in which there is no robot 200 being charged on the current charging pad 100, the high-priority charging pad P1 may preferentially perform the charging operation when the robot 200 approaches the high-priority charging pad P1 so as to be charged because the operating state of the current charging pad 100 is switched to the operation stop state.

When switching the operating state from the operation standby state to the operation stop state, the control unit 140 may maintain the operation standby state for a predetermined period of time and then switch the operating state to the operation stop state. That is, after providing sufficient movement time in which the robot 200 positioned on the high-priority charging pad P1 may move away from the high-priority charging pad P1, the control unit may switch the operating state to the operation stop state. If the operating state is immediately switched to the operation stop state without maintaining the operation standby state for a predetermined period of time, there may occur a problem in that the robot positioned on the charging pad 100 downstream of the high-priority charging pad P1 may collide with the robot positioned on the high-priority charging pad P1. Therefore, when switching the operating state of a current charging pad 100 from the operation standby state to the operation stop state, the control unit 140 may maintain the operation standby state for a predetermined period of time to allow the robot 200 on the current charging pad 100 to move away from the current charging pad and then switch the operating state to the operation stop state. In this case, the predetermined period of time may be set to about 30 seconds.

When the occupation by the robot 200 is not detected in the operation standby state, the control unit 140 may stop outputting the status signal through the output terminal 120. That is, since the status signal is outputted to the low-priority charging pad P2 only when the charging unit 130 is occupied in the operation standby state, the control unit 140 may stop outputting the status signal when the charging unit 130 is not occupied. In this case, since the operating state of the low-priority charging pad P2 is switched to the operation stop state, the robot 200, which enters subsequently, may be guided to be charged by the current charging pad 100 instead of the low-priority charging pad P2.

In this case, the control unit 140 may determine whether the robot 200 is positioned on the charging unit 130 by being provided with the charging current, which is generated when the charging unit 130 charges the robot 200, from the charging unit 130. That is, when the charging unit 130 starts charging the robot 200, it may be determined that the robot 200 is positioned on the charging unit 130, such that whether the robot 200 occupies the charging unit 130 may be determined by using the charging current.

According to an exemplary embodiment, a detecting sensor 150 may be provided on the charging pad 100, and whether the robot 200 occupies the charging unit 130 may be determined by using a detection signal received from the detecting sensor 150. In this case, any detecting sensor such as an illuminance sensor or a distance sensor may be used as long as the detecting sensor 150 may determine whether the robot 200 is positioned on the charging unit 130.

When there is no high-priority charging pad P1 connected to the input terminal 110 or the charging pad 100 is set as the highest-priority charging pad, the control unit 140 may maintain the operating state of the current charging unit 130 as the operation standby state regardless of whether the status signal is received. That is, in the case of the highest-priority charging pad 100, the operating state is always set as the operation standby state, such that the robot 200 may be charged from the highest-priority charging pad.

Figure 4:
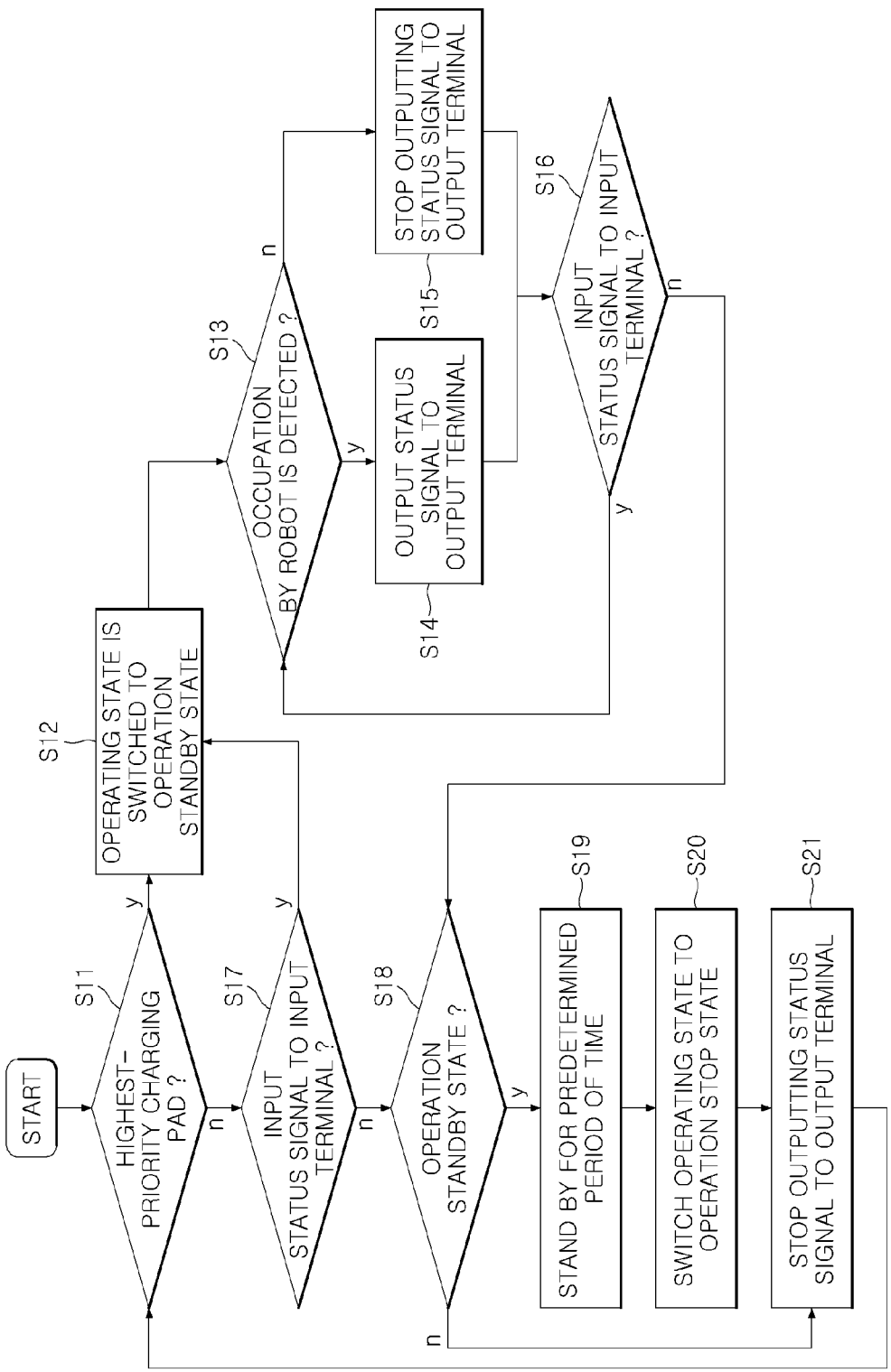
FIG. 4 is a flowchart illustrating an operation of the charging pad according to an exemplary embodiment of the present invention.

FIG. 4 is a flowchart illustrating an operation of the charging pad 100 according to an exemplary embodiment of the present invention.

Referring to FIG. 4, the control unit 140 may determine first whether the charging pad 100 is the highest-priority charging pad (S11). In this case, when the charging pad 100 is the highest-priority charging pad, the operation standby state may be always maintained (S12). In contrast, when the charging pad 100 is not the highest-priority charging pad, whether the status signal is inputted to the input terminal 110 may be checked (S17). When the status signal is inputted, which means that the robot 200 is positioned and being charged on the high-priority charging pad P1, the control unit 140 may switch the operating state of the charging pad 100 to the operation standby state (S12).

Thereafter, when the occupation of the charging pad 100 by the robot 200 is detected (S13), the status signal may be outputted to the output terminal 120 (S14). That is, the status signal may be transmitted to the low-priority charging pad P2, such that the operating state of the low-priority charging pad P2 may be switched to the operation standby state. In contrast, when the occupation by the robot 200 is not detected (S13), the output of the status signal to the output terminal 120 is stopped (S15), such that the operating state of the low-priority charging pad P2 may be switched to the operation stop state.

The control unit 140 may periodically or continuously check whether the status signal is inputted to the input terminal 110 (S16). When the status signal is inputted, the control unit 140 may check whether the robot 200 occupies the charging pad 100 while maintaining the operation standby state. In contrast, when the status signal is not inputted (S16), the operating state of the charging unit 130 may be checked (S18). That is, when the operating state of the charging unit 130 is the operation standby state, the operation standby state may be maintained for the predetermined period of time (S19), the operating state may then be switched to the operation stop state (S20), and the output of the status signal to the output terminal 120 may be stopped (S21).

When the status signal is not inputted to the input terminal (S17) and the operating state is in the operation stop state (S18), the operation stop state may be maintained, and the state in which the status signal is not outputted to the output terminal 120 may be maintained (S21).

According to one embodiment, step S11 may be omitted, and the status signal may be always inputted to the input terminal 110 of the highest-priority charging pad.

According to another embodiment, in a case in which the status signal is not inputted to the input terminal 110 in step S16, the process may go directly to step S19 instead of step S18 on the assumption that there is no change in the operating state after the operating state is switched to the operation standby state in step S12.

Figure 5:
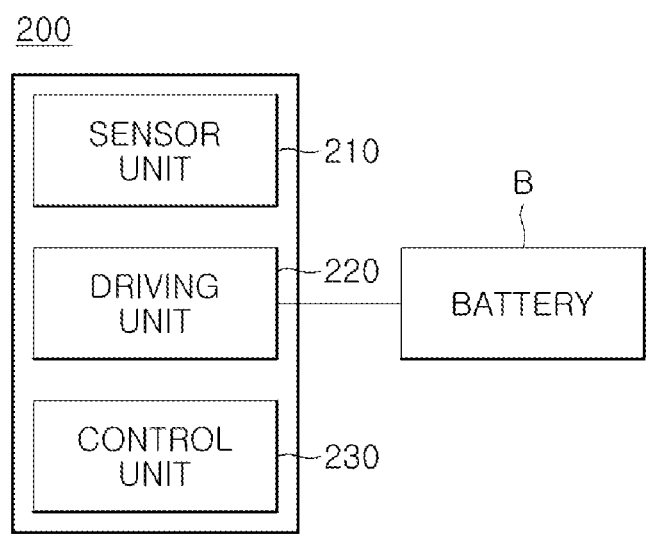
FIG. 5 is a block diagram of a robot according to an exemplary embodiment of the present invention.

FIG. 5 is a block diagram of the robot 200 according to the exemplary embodiment of the present invention.

Referring to FIG. 5, the robot 200 according to the exemplary embodiment of the present invention may include a sensor unit 210, a driving unit 220, and a control unit 230.

The sensor unit 210 may use a plurality of sensors to generate sensing data in accordance with the movement. The sensor unit 210 may include an inertial measurement unit (IMU) sensor, a GPS sensor, a wheel encoder sensor, a LiDAR sensor, and the like and may additionally include various types of sensors.

The driving unit 220 may support the movement of the robot 200 by applying various types of driving systems such as wheels or caterpillars. According to the exemplary embodiment, the driving unit 220 may be connected to a motor driven by a battery B in order to implement the movement of the robot.

The control unit 230 may generate information about a position of the robot 200 by using the sensing data from the sensor unit 210 and may set the traveling route based on the generated position information. Thereafter, the control unit 230 may control the driving unit 220 so that the robot may move along the traveling route. When a state of charge (SOC) of the battery is equal to or lower than a reference value, a predetermined charging station may be set as a preferential stopping area in the traveling route so that the robot may pass through the charging station. The control unit 230 may include any type of device capable of processing data, such as a processor. Here, the processor may refer to a hardware built-in data processing device having a circuit physically structured to perform a function expressed in a code or instructions included in a program. Examples of the hardware built-in data processing device may include processing devices such as a microprocessor, a central processing unit (CPU), a processor core, a multiprocessor, an application-specific integrated circuit (ASIC), a field programmable gate array (FPGA), etc.

Figure 11:
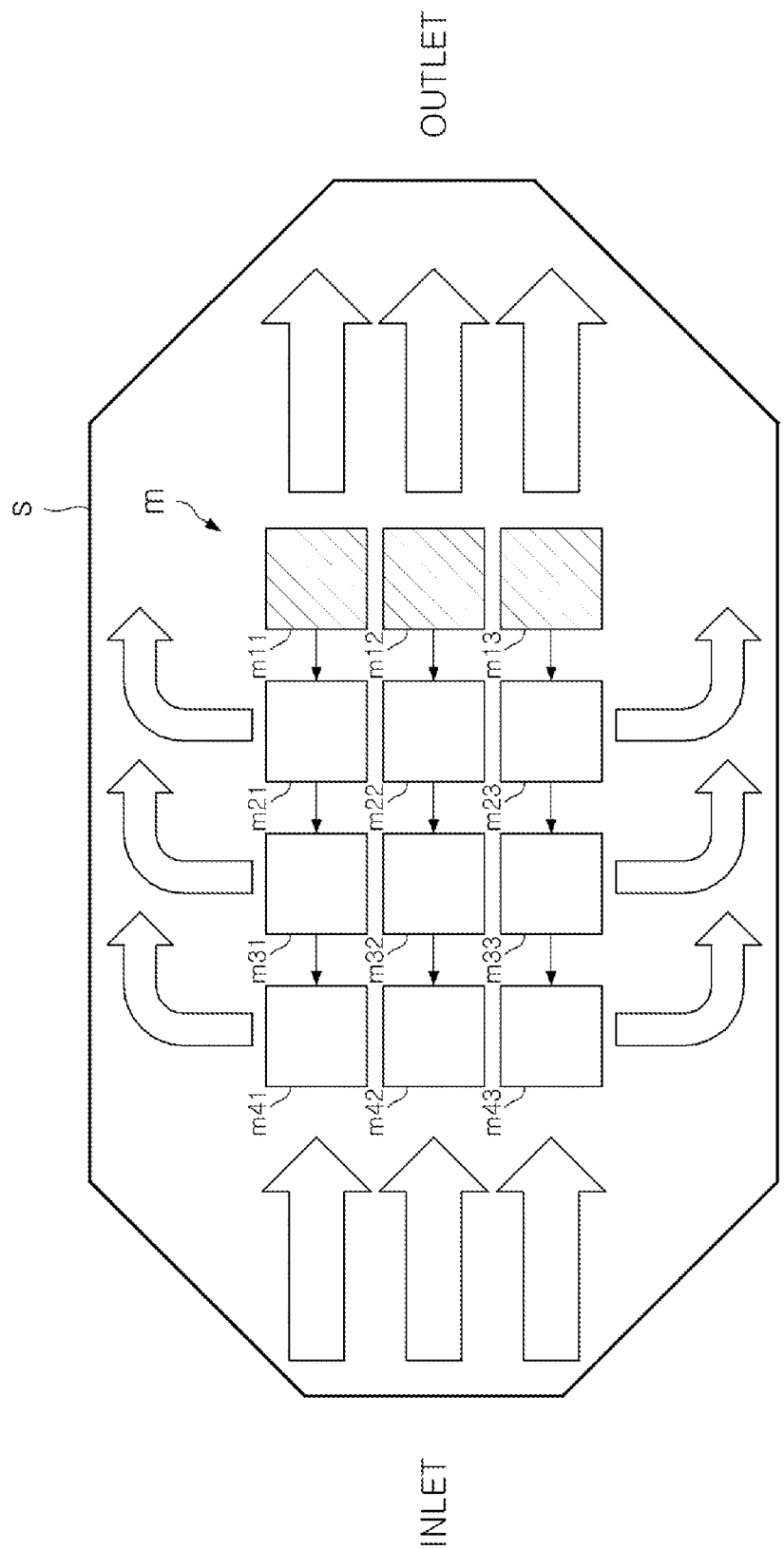
FIGS. 11 to 13 are schematic views illustrating operations of charging robots in a charging station according to an exemplary embodiment of the present invention.

As illustrated in FIG. 11, a charging station s may include an inlet and an outlet and may include a charging matrix m in which a plurality of charging arrays is arranged in parallel. In addition, the charging station s includes available spaces in which the robots 200 move, such that the robots 200 may be seated on the charging pads 100 while avoiding other robots in the charging station s.

In this case, the control unit 230 may set the traveling route so that the robot 200 may move in one direction from the inlet to the outlet of the charging station s, and the robot 200 may be seated and charged on the charging pad 100 in the operation standby state in the charging matrix m. In this case, the control unit 230 may stop the movement of the robot 200 when the operation of charging the battery is detected. Specifically, the control unit 230 may detect the operation of charging the battery through a battery management system (BMS) (not shown) included in the robot 200. When the charging operation is detected, the control unit 230 may stop the movement, such that the robot 200 may be charged on the corresponding charging pad 100.

Thereafter, when the charging operation is stopped or completed, the control unit 230 may control the driving unit 220 so that the robot 200 may move along the traveling route again. For example, when the operating state of the charging pad 100 is switched to the operation stop state, the operation of charging the robot 200 positioned on the corresponding charging pad 100 is stopped, such that the control unit 230 may allow the robot 200 to travel again along the traveling route in the charging station s. In addition, when the state of charge of the battery is equal to or higher than a charging completion value, which means that the charging operation is completed, such that the control unit 230 may allow the robot 200 to move along the traveling route and move away from the charging station s.

According to one exemplary embodiment, there may a case when all of the charging pads 100 are occupied in the charging station s, or the robot 200 may pass by a vacant charging pad while the robot 200 performs an avoidance operation. In this case, since the robot 200 is set to move in one direction in the charging station s, the robot 200 cannot return back and may move out of the charging station s by passing through the charging station s. That is, the robot 200 may move away from the charging station s in a state in which the robot is not sufficiently charged. In this case, the control unit 230 may reset the charging station s as the preferential stopping area in the traveling route so that the robot 200 passes through the charging station again in the same direction.

Specifically, when the state of charge of the battery becomes equal to or lower than the reference value, the control unit 230 may set the state of the battery as a charging required state and set the traveling route so that the robot passes the charging station s. Thereafter, when the robot 200 moves away from the charging station s before the robot 200 is completely charged (e.g., when performing an avoidance operation), the charging required state is not yet released, such that the traveling route may be set so that the robot may return back to the charging station s. Thereafter, when the charging operation is completed, the charging required state is released, such that the robot may return to the existing traveling route. In this case, the reference value may be set to 10% of an overall battery capacity, and the charging completion value may be set to 90% of the overall battery capacity. However, according to the exemplary embodiment, the reference value and the charging completion value may be variously selected other than the set values.

When there is an obstacle on the traveling route for the robot 200, the control unit 230 may control the driving unit 220 so that the robot moves while avoiding the obstacle. Therefore, when other robots 200 being charged are present in the charging station s, the robot may move while avoiding the robots being charged, such that the robot may be guided to be seated on the vacant charging pad in the charging station. According to the exemplary embodiment, the robot 200 may move away from the charging station s during the avoidance movement, such that the control unit 230 may reset the preferential stopping area on the traveling route so that the robot 200 passes through the charging station again.

According to the exemplary embodiment, the operation of the robot in the charging station s may be learnt by machine learning or the like, such that the robot 200 may be guided to be quickly seated on the charging pad 100 in the charging station.

Figure 6:
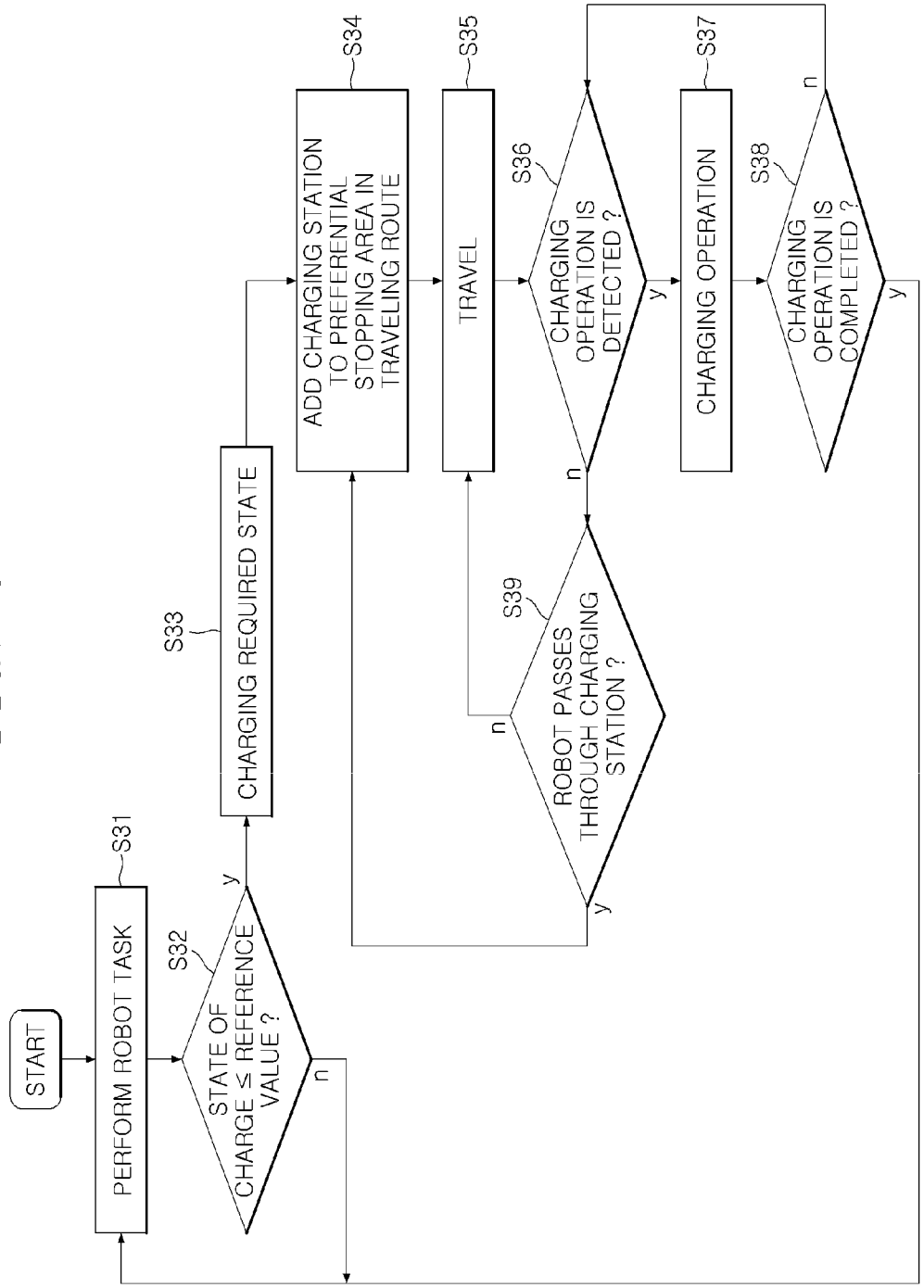
FIG. 6 is a flowchart illustrating an operation of the robot according to an exemplary embodiment of the present invention.

FIG. 6 is a flowchart illustrating an operation of the robot according to the exemplary embodiment of the present invention.

Referring to FIG. 6, the robot 200 may perform a predetermined robot task (S11), and a traveling route for performing the robot task may be set. Thereafter, whether the state of charge of the battery included in the robot 200 is equal to or lower than the reference value may be checked (S32). When the state of charge is equal to or lower than the reference value, the state of the robot 200 may be set to the charging required state (S33).

In the case of the charging required state, the charging station s may be added, as the preferential stopping area, to the traveling route for the robot 200, such that the robot 200 may be charged (S34). Therefore, the robot 200 may travel to the charging station s (S35). When the charging operation is detected (S36), the robot 200 may stop moving and be charged (S37). Thereafter, when the state of charge is equal to or higher than the charging completion value, it is determined that the charging operation is completed (S38), such that the predetermined robot task may be performed (S31).

In contrast, when the charging operation is not detected (S36) in the state in which the charging operation is not completed (S38), whether the robot 200 passes through the charging station may be checked (S39). In the case in which the robot 200 does not pass through the charging station s, the robot is made to travel to the charging station (S35), such that the robot may be charged on the charging pad 100 on which the charging operation is detected (S36 and S37). However, when the robot passes through the charging station (S39) in the state in which the charging operation is not completed (S36), the charging station is added as the preferential stopping area to the traveling route (S34), such that the robot 200 may travel to the charging station again (S35).

FIG. 7 is a schematic view illustrating an exemplary embodiment in which one robot 200 is charged on the charging array.

Figure 7A:
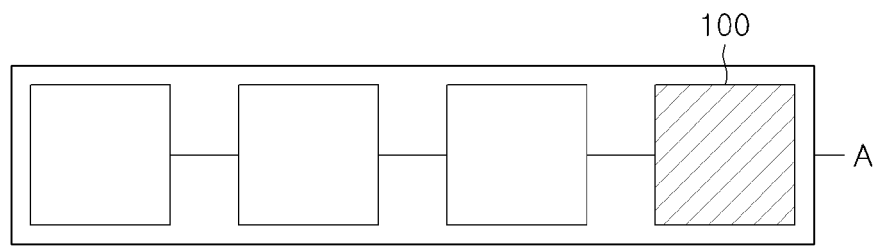
FIGS. 7A-7C are schematic views illustrating an exemplary embodiment in which one robot is charged on the charging array.

First, referring to FIG. 7A, a charging array A including a plurality of charging pads 100 may be provided. At the initial time, only the charging pad 100 disposed at the outermost periphery may remain in the operation standby state. In this case, the charging pad 100 in the operation standby state is illustrated by hatching.

Figure 7B:
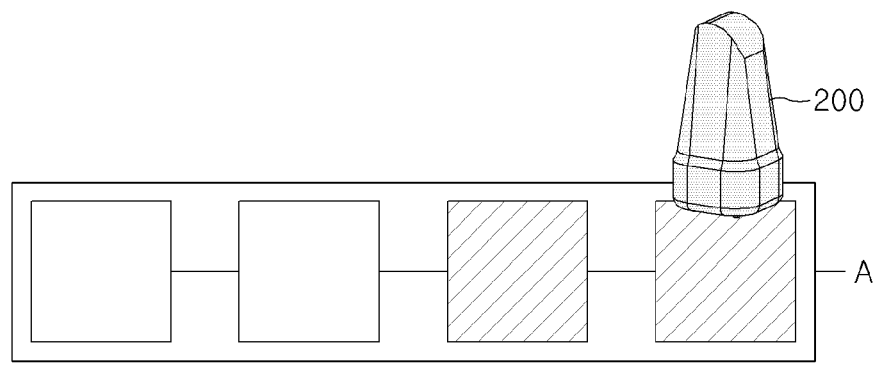

Thereafter, as illustrated in FIG. 7B, when the robot 200 enters, the robot 200 may move while passing the remaining charging pads in an operation stop state and may be stopped and charged on the charging pad 100 in an operation standby state disposed at the outermost periphery. In this case, the charging pad 100 disposed at the outermost periphery transmits the status signal to the low-priority charging pad disposed adjacent to the charging pad 100, such that the corresponding charging pad may be switched to the operation standby state.

Figure 7C:
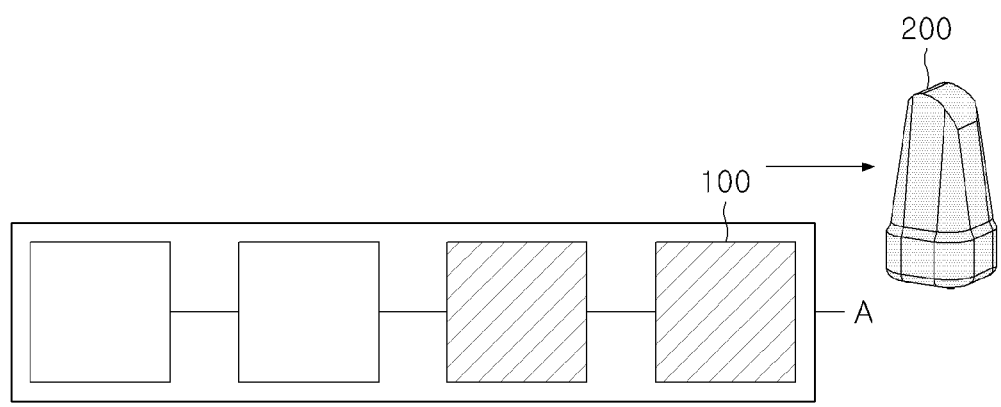

As illustrated in FIG. 7C, when the charging operation is completed, the robot 200 may move away from the charging array A, and in this case, the charging pad 100 disposed at the outermost periphery may stop transmitting the status signal. In this case, the low-priority charging pad switches from the operation standby state to the operation stop state. In this case, the operation standby state is maintained for a predetermined period of time (e.g., 30 seconds) from the time the charging operation is completed in order to ensure the time for which the robot 200 may move away from the charging array A, and then the operating state is switched to the operation stop state. FIG. 7C illustrates a state immediately after the robot 200 has moved away from the charging array A but still within the predetermined period of time, and it can be ascertained that the low-priority charging pad is illustrated as still being in the operation standby state.

FIGS. 8A-8C, 9A-9C and 10A-10C are schematic views illustrating exemplary embodiments in which three robots 200 are sequentially charged on the charging array A.

Figure 8B:
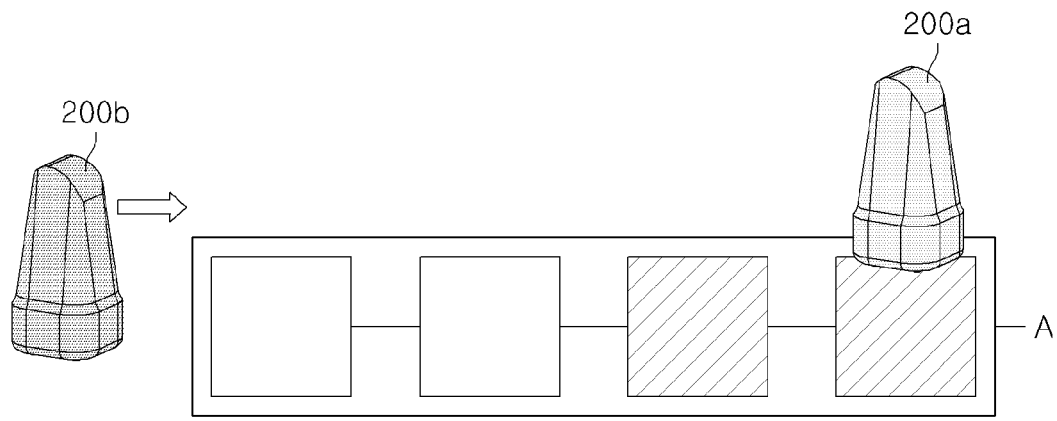
FIGS. 8A-8C, 9A-9C and 10A-10C are schematic views illustrating exemplary embodiments in which three robots are charged on the charging array.
Figure 8A:
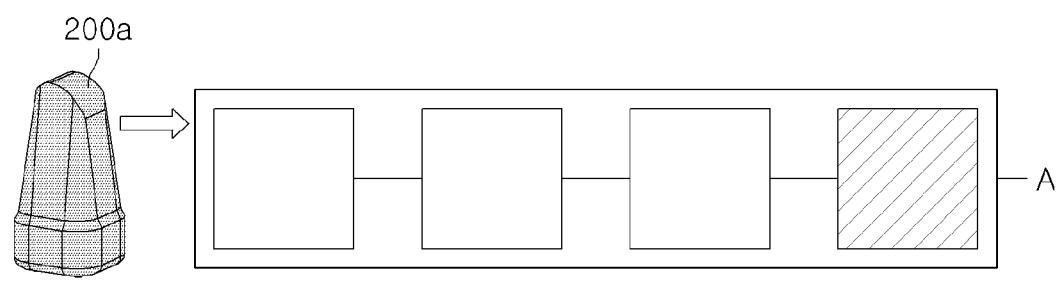
Figure 8C:
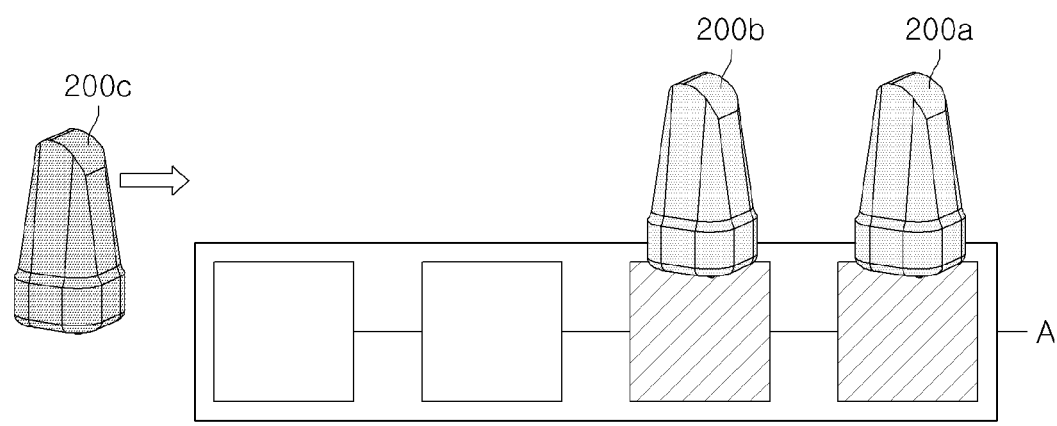
Figure 9A:
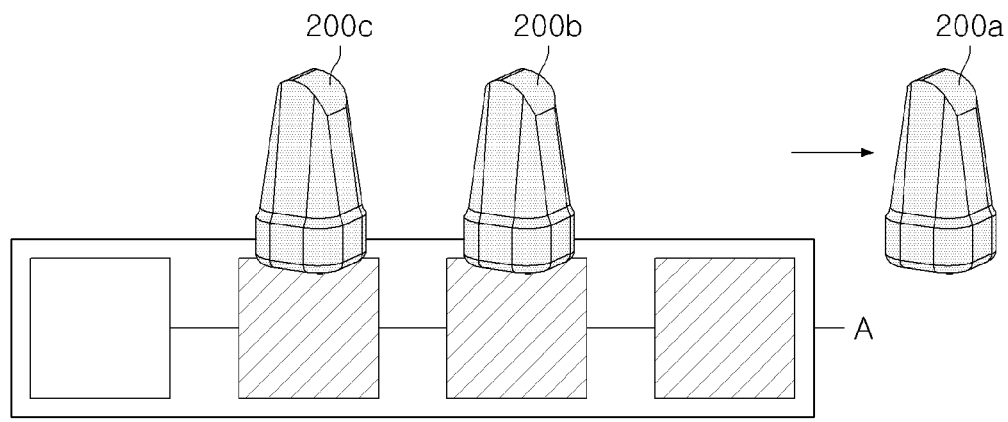

First, referring to FIG. 8A, the charging array A including a plurality of charging pads 100 may be provided. At the initial time, only the charging pad 100 disposed at the outermost periphery may remain in the operation standby state. Thereafter, as illustrated in FIG. 8B, when a first robot 200a enters, the first robot 200a may move while passing the remaining charging pads 100 in the operation stop state and may be stopped and charged on the charging pad in the operation standby state disposed at the outermost periphery. In this case, the charging pad 100 disposed at the outermost periphery transmits the status signal to a second charging pad 100 disposed adjacent to the charging pad, such that the corresponding charging pad 100 may be switched to the operation standby state. Therefore, as illustrated in FIG. 8C, a second robot 200b may be seated and charged on the second charging pad 100. Likewise, the second charging pad 100 may transmit the status signal to a third charging pad 100 to switch the third charging pad to the operation standby state. As illustrated in FIG. 9A, the third robot 200c may be seated and charged on the third charging pad 100. Likewise, the third charging pad 100 transmits the status signal to a fourth charging pad 100 to switch the state of the fourth charging pad to the operation standby state.

Figure 9B:
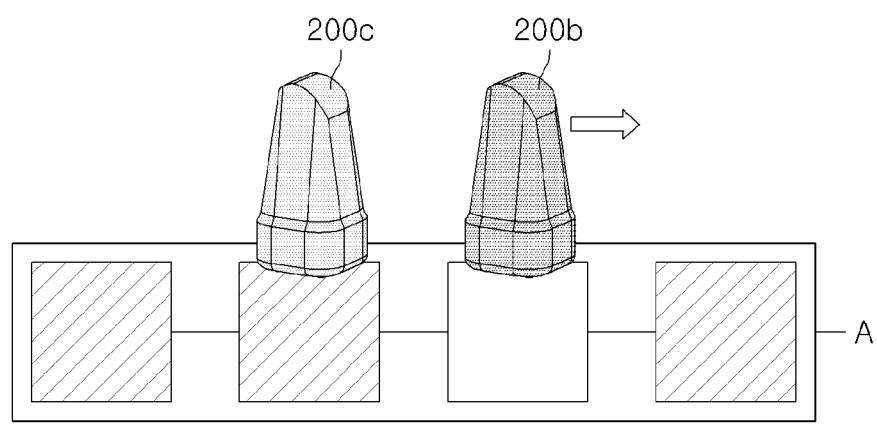

Meanwhile, as illustrated in FIG. 9A, the first robot 200a may be completely charged, and the first robot 200a may move away from the charging pad 100 disposed at the outermost periphery. In this case, the charging pad 100 disposed at the outermost periphery may stop transmitting the status signal when the first robot 200a moves away from the charging pad. As illustrated in FIG. 9B, the second charging pad 100 may maintain the operation standby state for a predetermined period of time and then switch to the operation stop state. In this case, the second robot 200b may move to continue charging and move in a predetermined one direction on the charging array A. That is, the second robot 200b may move to the charging pad 100 disposed at the outermost periphery, and the charging pad 100 disposed at the outermost periphery is always in the operation standby state, such that the second robot 200b may now be charged on the charging pad 100 disposed at the outermost periphery.

Figure 9C:
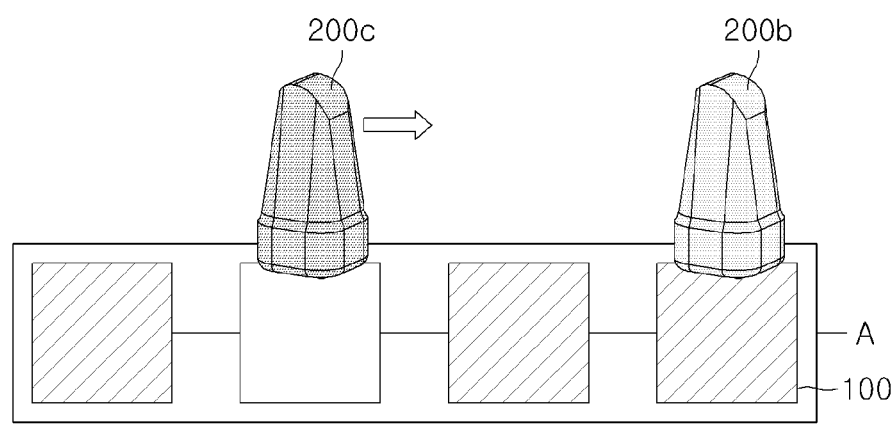

Thereafter, as illustrated in FIG. 9C, when the second robot 200b moves to the charging pad 100 disposed at the outermost periphery, the second charging pad 100 receives the status signal and switches to the operation standby state, whereas the third charging pad 100 cannot receive the status signal, such that the third charging pad maintains the operation standby state for a predetermined period of time and then switches to the operation stop state. In this case, the operation of charging the third robot 200c positioned on the third charging pad 100 is stopped, and as a result, the third robot 200c moves and is charged on the second charging pad 100 in the operation standby state. In this case, the third charging pad 100, which receives the status signal, switches back to the operation standby state.

Figure 10B:
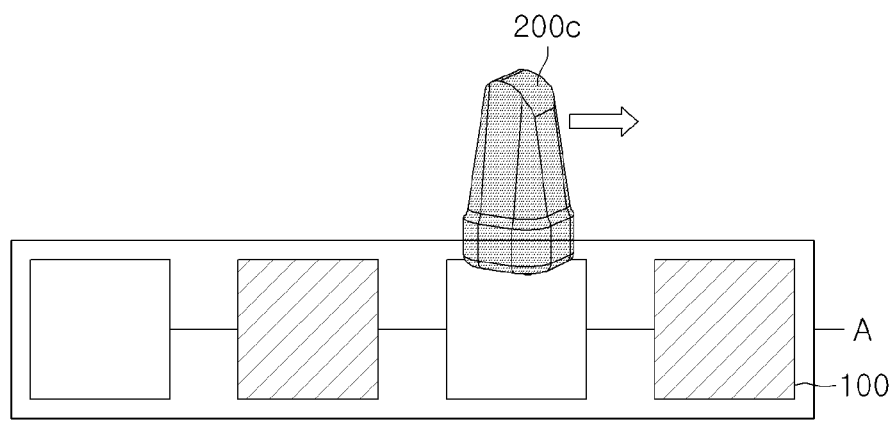
Figure 10A:
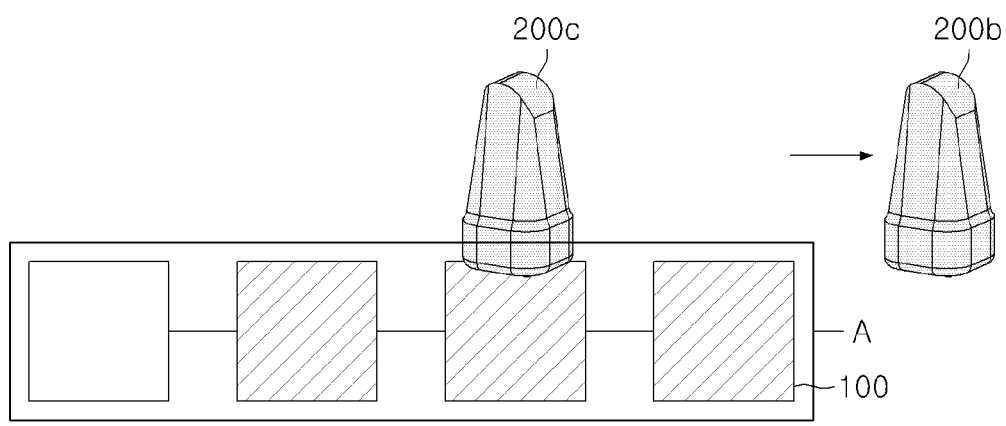
Figure 10C:
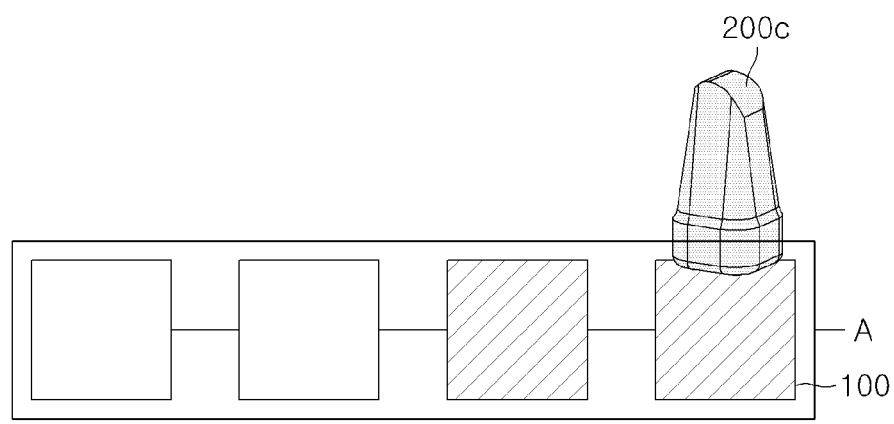

Referring to FIG. 10A, the second robot 200b is completely charged, and the second robot 200b may move away from the charging array A. In this case, as illustrated in FIG. 10B, the second charging pad 100 cannot receive the status signal, and as a result, the second charging pad switches to the operation stop state after a predetermined period of time. In this case, because the operation of charging the third robot 200c positioned on the second charging pad 100 is stopped, the third robot 200c may be driven and move to the charging pad 100 disposed at the outermost periphery and may be charged on the charging pad disposed at the outermost periphery. In this case, the second charging pad 100, which receives the status signal, switches back to the operation standby state as shown in FIG. 10C.

As described above, the robots 200 may be charged by being sequentially positioned on the charging pads 100 from the charging pad positioned at the outermost periphery on the charging array A. When the robots 200 are completely charged and move away from the charging pads 100, other robots move and are placed on the vacant charging pads. Therefore, it is possible to ensure a maximum number of charging pads 100 that may perform the charging operation, and to efficiently charge the robots 200.

Figure 12:
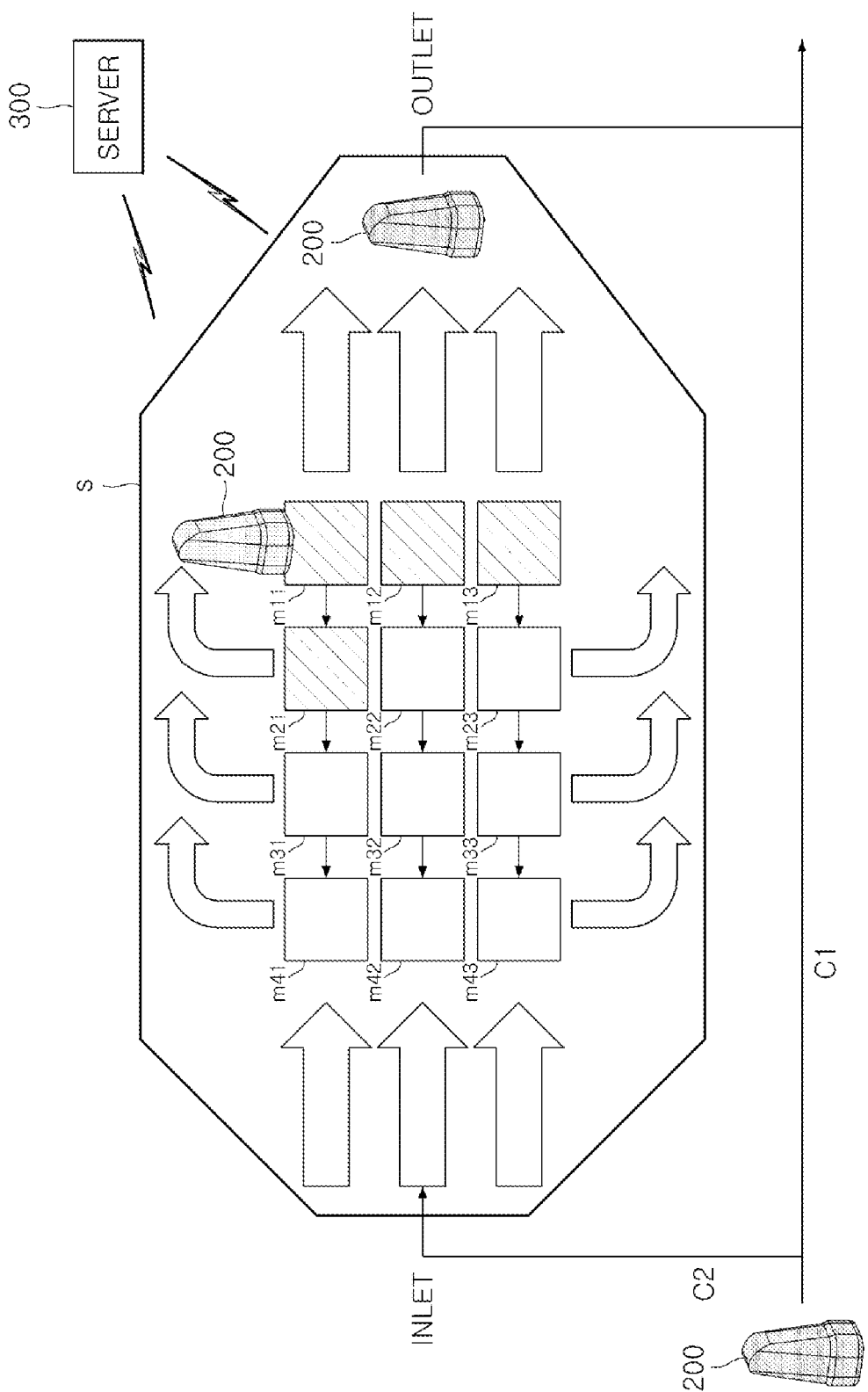
Figure 13:
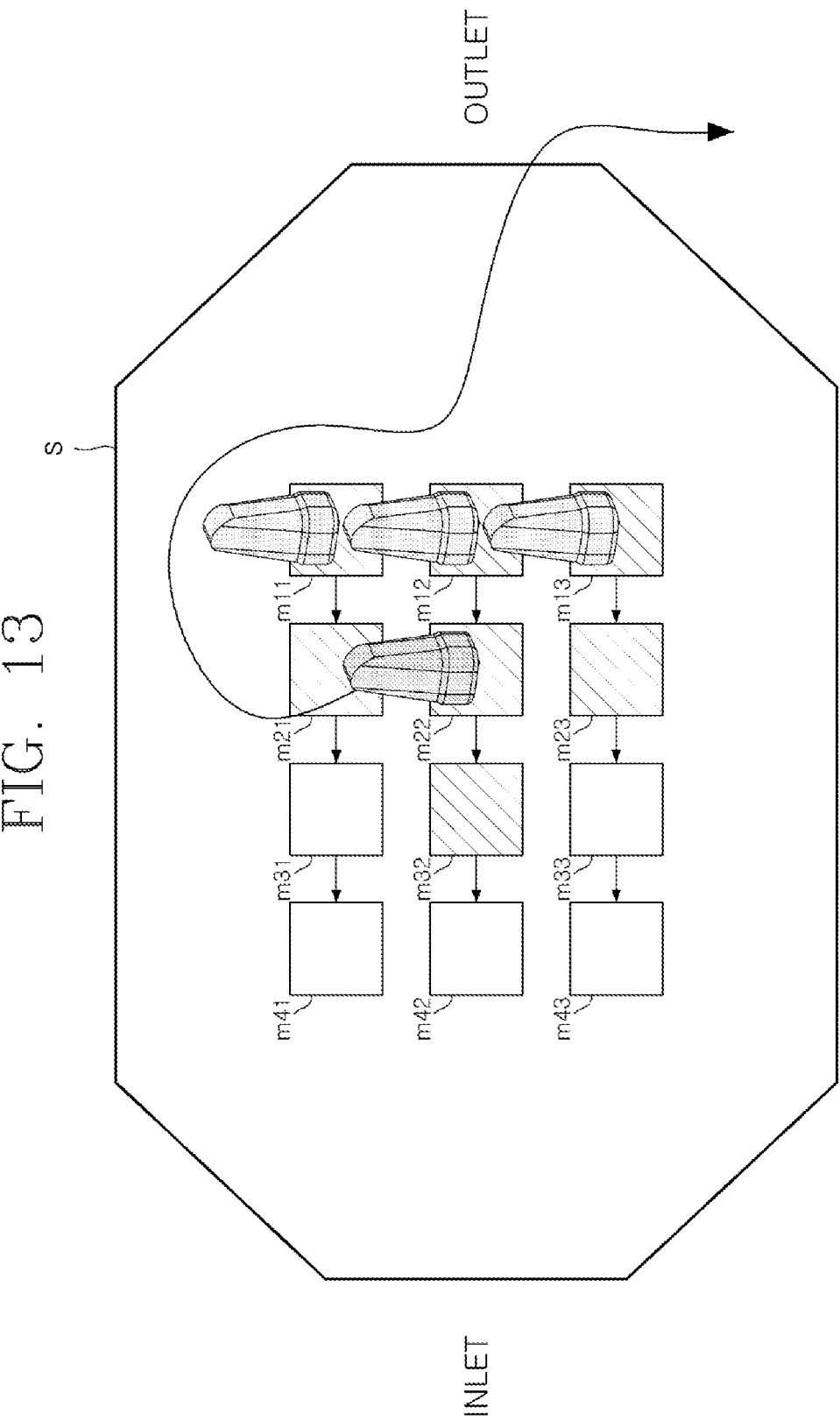

FIGS. 11 to 13 are schematic views of states in which the robots 200 are charged in the charging station s according to the exemplary embodiment of the present invention.

As illustrated in FIG. 11, the charging station s may include the charging matrix m in which the plurality of charging arrays m11-m41, m12-m42, m13-m43 are arranged in parallel, and the charging station s may include available spaces in which the robots 200 move. Therefore, the robot 200 may be seated and charged on the charging pad 100 while avoiding other robots in the charging station s. The charging station s may be installed in a specific space in a building. According to the exemplary embodiment, the charging station s may be installed in an elevator for transporting the robot, such that the robot may be charged while being moved.

As illustrated in FIG. 12, a predetermined traveling route C1 may be provided for each of the robots 200, and a new traveling route C2 may be set for each of the robots 200, which need to be charged among the robots 200, so that the robot 200 moves via the charging station s. In this case, the traveling route may be set such that each of the robots 200 moves in one direction from the inlet to the outlet of the charging station s, and each of the robots 200 may be seated and charged on a vacant charging pad 100 while moving along the traveling route. The robots 200, which are completely charged, may move out of the charging station s, and then travel along the existing traveling route C1 again.

According to the exemplary embodiment, the robot 200 may move away from the charging station s in a state in which the robot 200 is not completely charged. In this case, the traveling route may be reset so that the robot 200 may pass through the charging station s again.

As illustrated in FIG. 13, a traveling route may be blocked by the robots 200 positioned in the first column m11-m13 when a robot 100 being charged in second column m21-m23 is completely charged first. In this case, the completely charged robot 200 in the second column m21-m23 may perform an obstacle avoidance operation to avoid the robots in the first column m11-m13 still being charged, and then may move along the predetermined traveling route.

According to the exemplary embodiment, in the case where the robot is completely charged but may be entirely blocked by other robots still being charged, the robot, which is completely charged, may perform the obstacle avoidance operation to move away from the charging pad 100, and as a result, the low-priority charging pad 100 may switch to the operation stop state. That is, the blocked robot 200 positioned on the low-priority charging pad may move to be seated on a new charging pad 100 which is not occupied, and a route through which the completely charged robot may escape may be made in accordance with the movement of the robot positioned on the low-priority charging pad. Therefore, even though the traveling route is blocked by the robots being charged in the charging station, the robots may perform the obstacle avoidance operation to return back to the traveling route.

The obstacle avoidance function of the robot may be basically mounted on the robot 200 in accordance with an autonomous driving scenario rather than a function specially installed in consideration of only the charging scenario. Accordingly, it is possible to minimize the number of functions which need to be additionally set to the robot in order to allow the robot to use the charging station s. For example, when it is necessary to charge the robot 200 that may basically and autonomously move while avoiding an obstacle, it is possible to change the configuration to use the charging station s according to the exemplary embodiment of the present invention by additionally setting only three functions including a function of changing the traveling route so that the robot 200 moves via the charging station, a function of stopping and charging the robot when the charging operation is initiated, and a function of allowing the robot to travel again along the traveling route when the charging operation is completed to some extent.

In the above-mentioned exemplary embodiments of the present invention, some of the functions described as being performed by the control unit 230 of the robot 200 may be performed by a server 300 that communicates with the robot 200. That is, some functions of the control unit 230 may be processed by the server 300, and instructions generated by processing of the server may be transmitted to the robot 200 and used to operate the robot 200. For example, tasks such as setting a traveling route in accordance with a destination and changing the traveling route in accordance with a situation may be processed by the server 300, and the functions of the server and the robot 200 may be distributed as the robot 200 receives instructions related to the operation such as a movement direction and a speed from the server and is operated accordingly. This may be appropriately set in accordance with hardware performance of the server 300 and the robot 200.

The present invention described above may be implemented as a computer-readable code on a computer-readable medium on which a program is recorded. The computer-readable medium may continuously store computer-executable programs or temporarily store the programs for execution or download. In addition, the medium may include various recording means or storage means with which a single piece of hardware or several pieces of hardware may be combined. The medium is not limited to a medium directly connected to any computer system but may be distributed on a network. Examples of media may include magnetic media such as hard disks, floppy disks, and magnetic tapes, optical recording media such as CD-ROMs and DVDs, magneto-optical media such as floptical disks, ROMs, RAMs, and flash memories and may be configured to store program instructions. In addition, examples of other media may include recording media and storage media which are managed by application stores that distribute applications, sites that supply or distribute various types of software, and servers. Therefore, it should be appreciated that the detailed description is interpreted as being illustrative in every sense, not restrictive. The scope of the present invention should be determined based on the reasonable interpretation of the appended claims, and all of the modifications within the equivalent scope of the present invention belong to the scope of the present invention.

The present invention is not limited by the above-described exemplary embodiments and the accompanying drawings. It will be apparent, to those skilled in the art to which the present invention pertains, that constituent elements according to the present invention may be substituted, modified, and changed without departing from the scope of the technical spirit of the present invention.

What is claimed is:

1. A charging pad configured to charge a robot, comprising:
an input terminal connected to a high-priority charging pad;
an output terminal connected to a low-priority charging pad;
a charging unit configured to charge a robot positioned on the charging pad in accordance with a preset operating state; and
a control unit configured to selectively switch the preset operating state of the charging unit to an operation stop state, in which a charging of the robot is disabled, or to an operation standby state, in which the charging of the robot on the charging pad is enabled, and to output a status signal for the charging pad through the output terminal when an occupation of the charging unit by the robot is detected in the operation standby state, wherein the operating state of the charging unit is switched to the operation stop state responsive to an absence of a status signal from the high-priority charging pad through the input terminal, and to the operation standby state to enable charging of the robot on the charging pad, responsive to a presence of a status signal from the high-priority charging pad through the input terminal.

2. The charging pad of claim 1, wherein the charging unit charges the robot when the robot is positioned on the charging pad in the operation standby state, and the charging unit does not charge the robot in the operation stop state.

3. The charging pad of claim 1, wherein the control unit checks the operating state of the charging unit when the status signal is not received from the input terminal, and the control unit maintains the operation stop state when the operating state is in the operation stop state.

4. The charging pad of claim 1, wherein the control unit checks the operating state of the charging unit when the status signal is not received from the input terminal, and wherein when the operating state is in the operation standby state, the control unit maintains the operation standby state for a predetermined period of time and then switches the operating state from the operation standby state to the operation stop state.

5. The charging pad of claim 1, wherein when the occupation of the charging pad by the robot is not detected in the operation standby state, the control unit does not output the status signal through the output terminal.

6. The charging pad of claim 1, wherein the control unit determines whether the robot occupies the charging unit by using charging current generated when the charging unit performs a charging operation or by using a detection signal received from a detecting sensor that detects the robot positioned on the charging pad.

7. The charging pad of claim 1, wherein when there is no high-priority charging pad connected to the input terminal or the charging pad is set as a highest-priority charging pad, the control unit maintains the operating state of the charging unit in the operation standby state regardless of whether the status signal is received.

8. A charging station made by arranging a plurality of charging arrays in parallel, wherein the charging array is made by connecting the charging pads according to claim 1 in series.

9. A robot configured to travel autonomously and stop at a charging station having a plurality of charging pads for charging a battery of the robot, comprising:
a sensor unit configured to generate sensing data in accordance with a movement of the robot;
a driving unit configured to be driven by the battery to move the robot; and
a control unit configured to control an operation of the driving unit so that the robot travels along a traveling route when the traveling route is set based on position information calculated from the sensing data, and selectively moves to a high-priority charging pad over a low-priority charging pad in the charging station to charge the battery,
wherein the traveling route is set such that the charging station is included in a preferential stopping area when a state of charge (SOC) of the battery is equal to or lower than a reference value, and to move in one directions from an inlet to an outlet of the charging station, and
wherein the control unit stops the moving of the robot when an operation of charging the battery is detected, and moves the robot along the traveling route when the charging operation is stopped or completed.

10. The robot of claim 9, wherein when the robot passes through the charging station in a state in which the state of charge of the battery is lower than a charging completion value, the control unit resets a preferential stopping area in the traveling route so that the robot repeats the pass through the charging station.

11. The robot of claim 9, wherein when an obstacle is present on the traveling route, the control unit controls the driving unit so that the robot moves while avoiding the obstacle.

12. A robot charging system comprising:
a robot configured to pass through a charging station while traveling autonomously when a state of charge (SOC) of a battery in the robot is equal to or lower than a reference value; and
the charging station including a plurality of charging pads, configured to switch a low-priority charging pad to an operation standby state, in which a charging of the robot on the low-priority charging pad is enabled, when a high-priority charging pad in an operation standby state is occupied by the robot and the robot is being charged, and configured to switch the low-priority charging pad to an operation stop state, in which a charging of the robot on the low-priority charging pad is disabled, when the high-priority charging pad is unoccupied by the robot,
wherein the charging of the robot on the low-priority charging pad is disabled, and the robot on the low-priority charging pad is allowed to travel to the high-priority charging pad and to continue charging at the high-priority charging pad, when the high-priority charging pad is unoccupied.

* * * * *